United States Patent [19]

Sayyah

[11] Patent Number: 5,076,670
[45] Date of Patent: Dec. 31, 1991

[54] ISOLATED PIXEL LIQUID CRYSTAL LIGHT VALVE STRUCTURE

[75] Inventor: Keyvan Sayyah, Los Angeles, Calif.

[73] Assignee: Hughes Aircraft Company, Los Angeles, Calif.

[21] Appl. No.: 421,449

[22] Filed: Oct. 13, 1989

[51] Int. Cl.$^5$ .............................................. G02F 1/13
[52] U.S. Cl. ...................................... 359/72; 357/15; 357/30; 359/79; 359/84; 359/71
[58] Field of Search ................... 350/342, 338, 331 R, 350/334, 339 R; 357/30 K, 30 L, 15, 19

[56] References Cited

U.S. PATENT DOCUMENTS

| | | | |
|---|---|---|---|
| 3,824,002 | 7/1974 | Beard | 350/342 |
| 4,228,449 | 10/1980 | Braatz | 357/30 |
| 4,423,927 | 1/1984 | Bly | 350/342 |
| 4,622,654 | 11/1986 | Yaniv et al. | 350/342 |
| 4,726,660 | 2/1988 | Rushford | 350/347 E |
| 4,826,293 | 5/1989 | Grinberg et al. | 350/342 |
| 4,842,376 | 6/1989 | Efron et al. | |
| 4,881,110 | 11/1989 | Braatz et al. | 357/30 |
| 4,913,531 | 4/1990 | Efron et al. | 350/342 |
| 4,973,136 | 11/1990 | Braatz | 350/338 |

FOREIGN PATENT DOCUMENTS 0177773 8/1986 Japan .................................. 357/30 L
2011639 7/1979 United Kingdom ................ 350/342

OTHER PUBLICATIONS

U. Efron et al., "The Silicon Liquid-Crystal Light Valve", *J. Appl. Phys.*, 57(4), Feb. 15, 1985, pp. 1356–1368.

*Primary Examiner*—Rolf Hille
*Assistant Examiner*—Tan Ho
*Attorney, Agent, or Firm*—V. D. Duraiswamy; W. K. Denson-Low

[57] ABSTRACT

A photoconductive substrate is provided to voltage modulate a liquid crystal layer in response to input light. The substrate is partitioned into electrically isolated pixels to eliminate lateral spread of charge carriers therein, and increase the dynamic range of the liquid crystal light valve while preserving resolution. The substrate is partitioned by forming an interconnecting network of deep trenches in a surface thereof, and filling the trenches with an insulating material such as silicon dioxide. The opposite surface of the substrate is etched away to expose the silicon dioxide in the trenches, thereby providing the substrate with partitions which extend completely therethrough between the opposite surfaces.

17 Claims, 5 Drawing Sheets

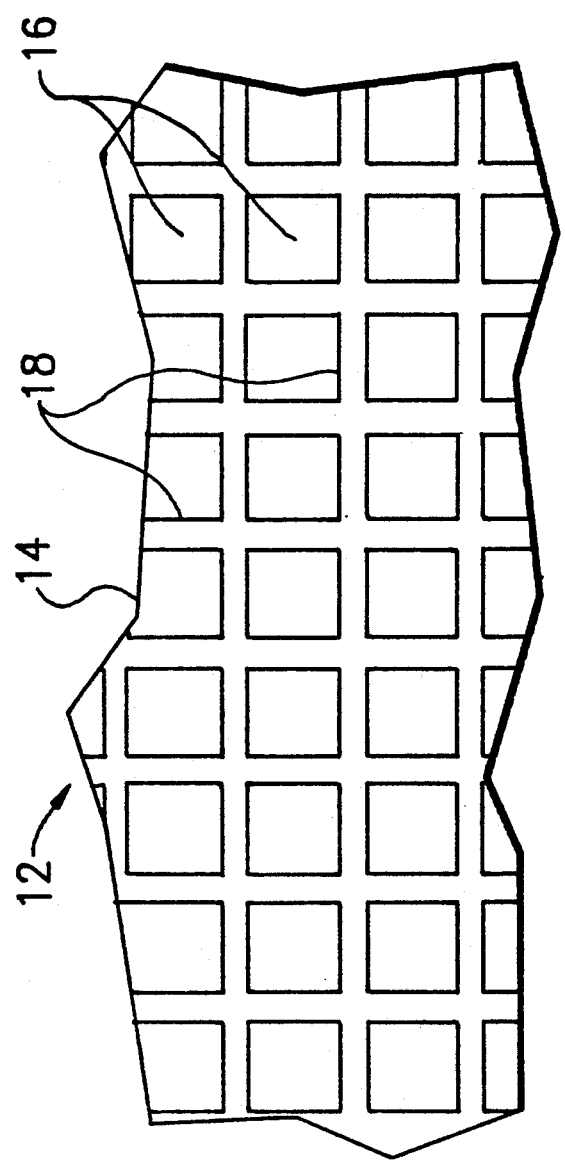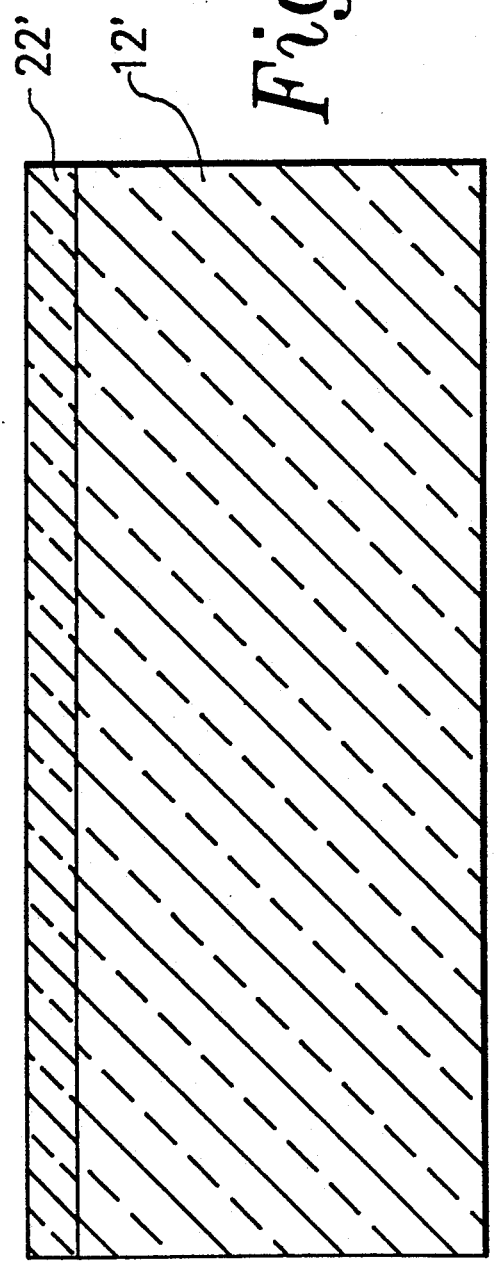

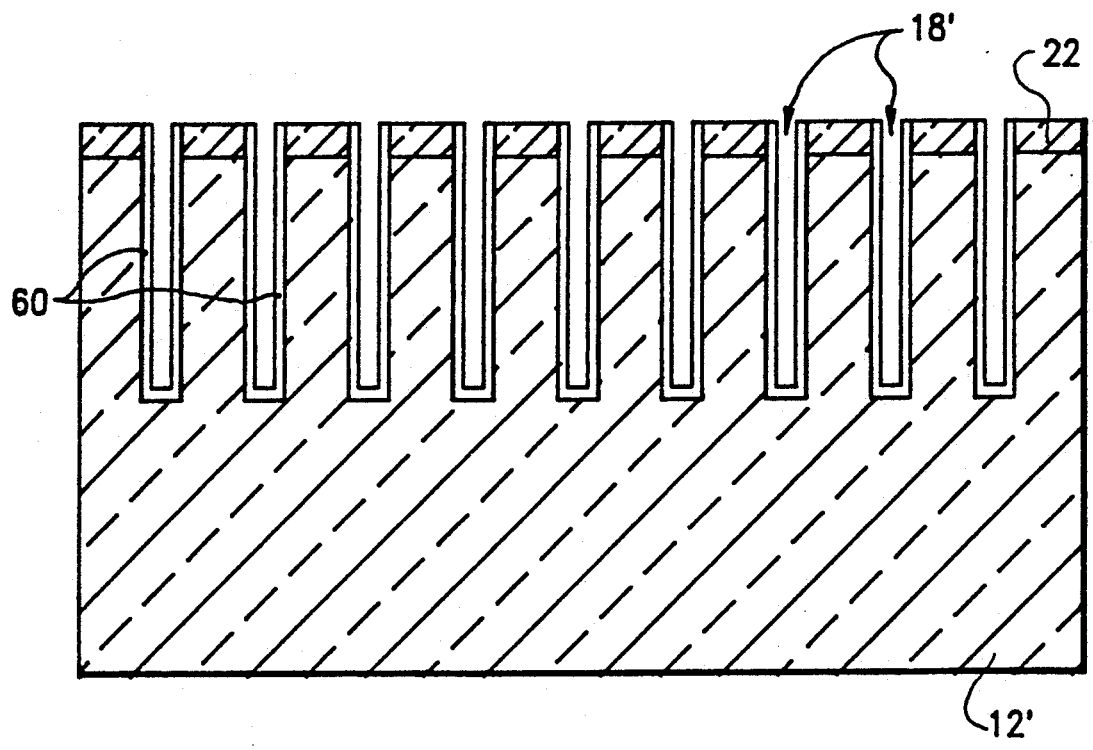
Fig.3.b.
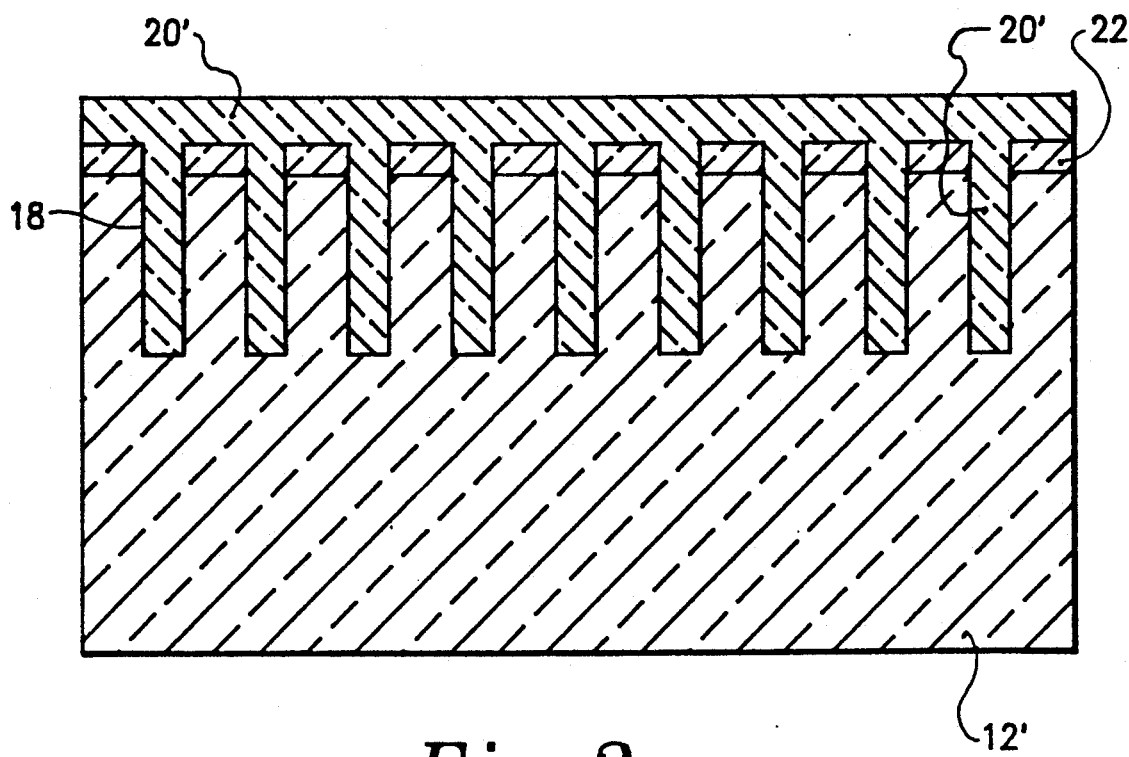
Fig.3.c.

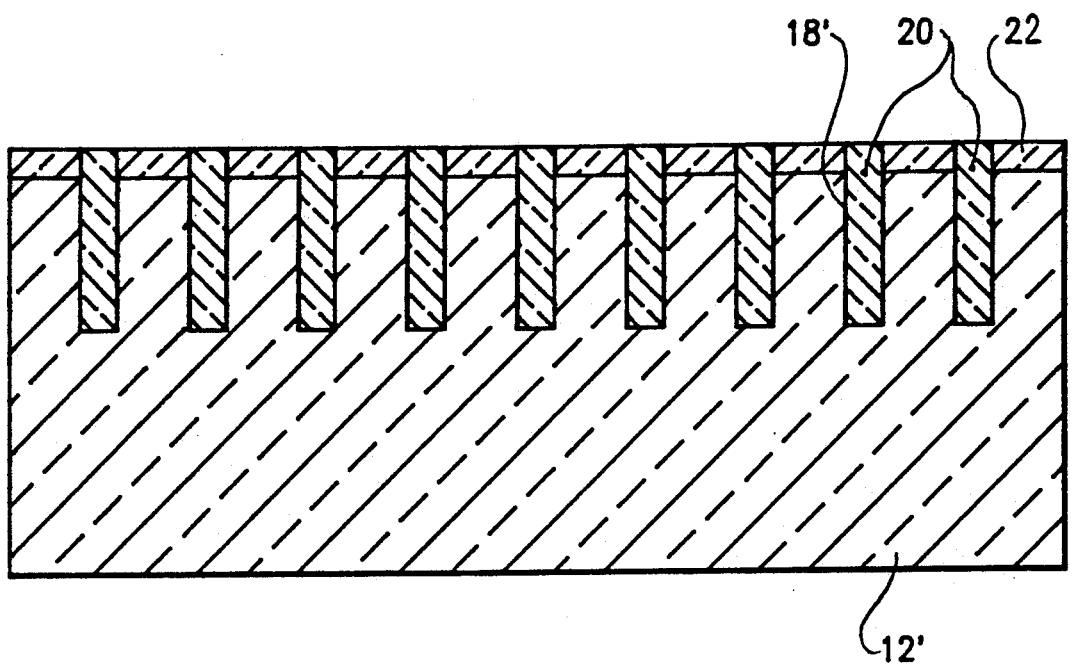
*Fig.3.d.*
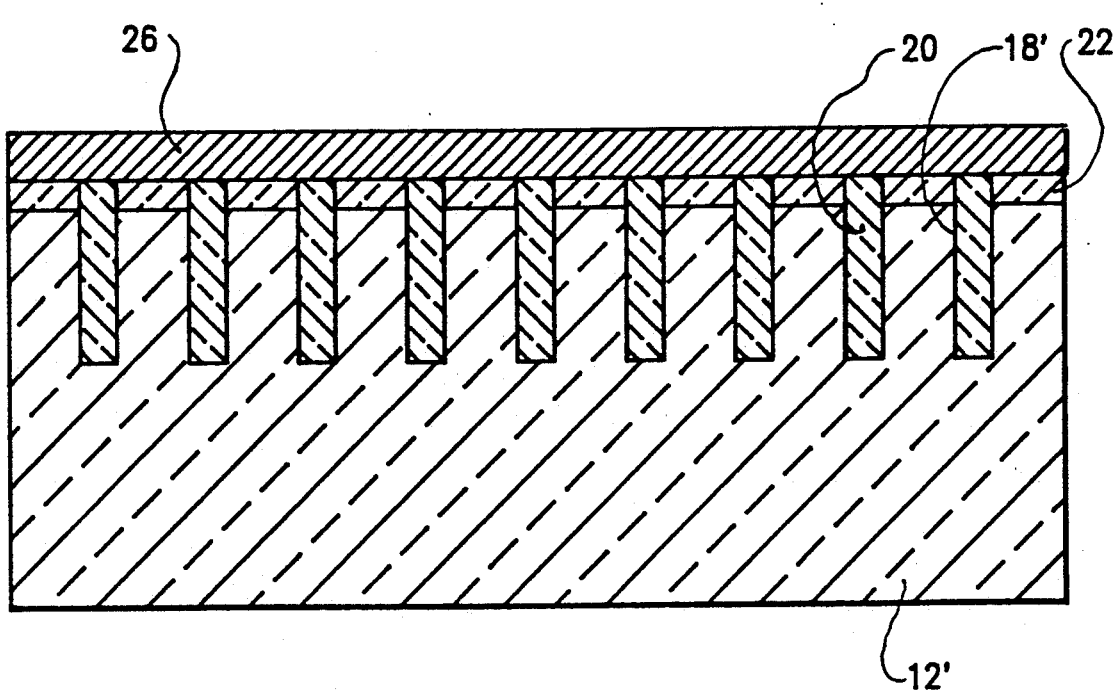
*Fig.3.e.*

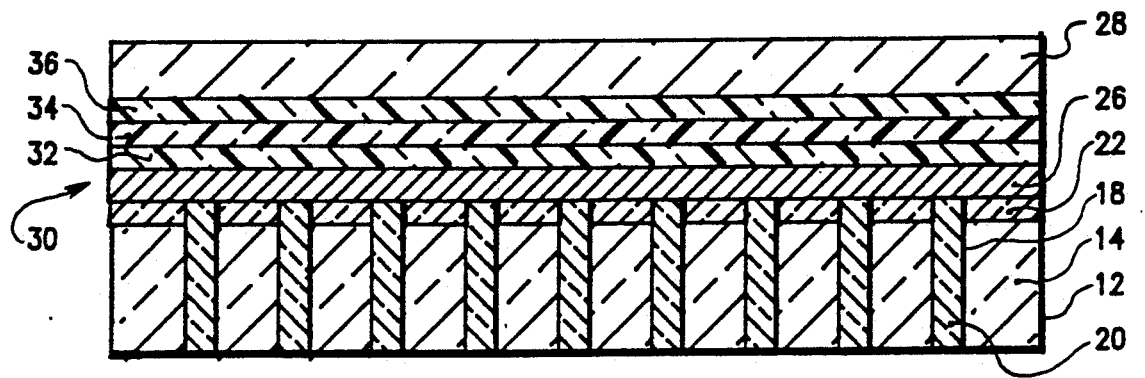
*Fig.3.f.*
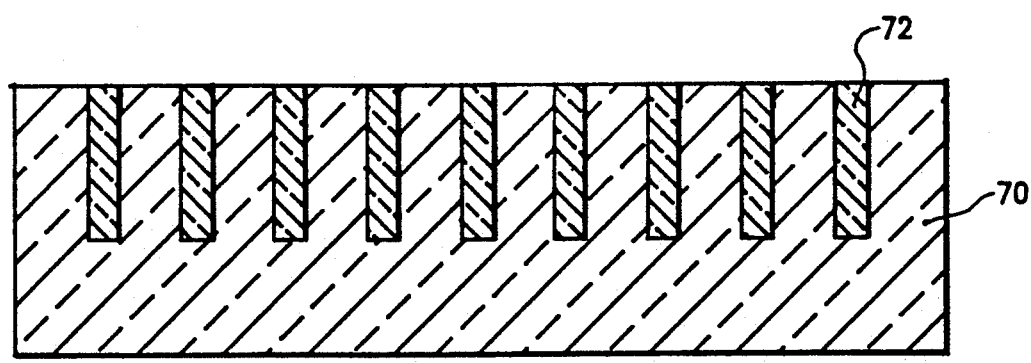
*Fig.4.*

ISOLATED PIXEL LIQUID CRYSTAL LIGHT VALVE STRUCTURE

BACKGROUND OF THE INVENTION

1. Field of the Invention

The present invention generally relates to the field of optoelectronics, and more specifically to an isolated pixel photoconductive structure for voltage modulating a liquid crystal layer in a liquid crystal light valve.

2. Description of the Related Art

The silicon photoconductor based liquid crystal light valve (LCLV), or spatial light modulator, performs the function of converting an input light image having a certain wavelength, intensity, and coherence conditions into an output image in which some or all of these parameters are varied. Applications of LCLVs include image amplifiers, wavelength converters, incoherent-to-coherent image converters, and adaptive optics. While image amplifiers find uses in large screen displays such as theaters, flight simulators, and command and control displays, image wavelength converters are used for displaying visible images from infrared scenery and the like. Incoherent-to-coherent image converters are used primarily for optical image processing.

The silicon LCLV to which the present invention constitutes a novel improvement is described in an article by U. Efron et al, entitled "The silicon liquid-crystal light valve", J. Appl. Phys. 57(4), Feb. 1985. The device consists of a high resistivity, $\pi$-silicon photoconductive layer or substrate, coupled with a dielectric silicon dioxide layer to form an MOS structure. A unified thin-film structure consisting of a dielectric mirror and a light blocking layer provides the high broadband reflectivity required, as well as optical isolation of the photoconductor from the high-intensity readout beam. The readout beam is reflected by the dielectric mirror through the liquid crystal. The latter is usually operated in a hybrid field effect mode. The MOS mode of operation consists of periodic depletion and accumulation phases. In the depletion (active) phase, the high-resistivity $\pi$-silicon is depleted completely, and electron-hole pairs generated by the input light are swept by the electric field, thereby producing the signal current that activates the liquid crystal.

The electric field existing in the depletion region acts to focus the signal charges, and to preserve the spatial resolution of the input image at relatively low photogenerated charge densities. However, at larger charge densities associated with a larger signal dynamic range, the photogenerated charge carriers will diffuse or spread laterally in a potential free region near the silicon back surface where the charge is generated. This is caused by partial collapse of the depletion region as the charge density increases. The signal charge goes through further lateral drift and diffusion as it drifts through the silicon thickness, and most importantly, to an even greater extent at the silicon/dielectric layer interface where the charge resides for a finite length of time. This lateral drift and diffusion of the signal charge results in significant loss in device resolution.

The lateral spread of photogenerated charge at the silicon/dielectric interface has been conventionally limited by means of a grid of "microdiodes" formed by regions of opposite doping polarity implanted into the silicon layer at the interface. The grid acts to focus the incoming charge carriers into the resolution cell defined by it, as well as to form "charge buckets" of carriers already residing at the interface.

Although effective at relatively low levels of photogenerated charge, the microdiode grid cannot contain the signal charge residing at the interface at high excitation levels. Once the potential wells formed by these diodes are partially filled with the signal charge, the surface potential is decreased and the charge can spill over to adjacent pixel areas. In addition, the microdiodes are not operative to prevent lateral spread of charge carriers at the silicon back interface at which the charges are generated, or in the bulk portion of the silicon layer. This limits the liquid crystal voltage swing and thereby the signal dynamic range and image contrast attainable in a LCLV without an accompanying loss of resolution.

SUMMARY OF THE INVENTION

The main purpose of the present invention is to improve the resolution, contrast ratio, and dynamic range of a LCLV. This is accomplished by electrically isolating each pixel or picture element from neighboring pixels by means of electrically insulating partitions formed through the thickness of the silicon photoconductive substrate. In this manner, the photogenerated charge is positively prevented from interdiffusion between adjacent pixels, even at very high levels of charge density which were unattainable in the prior art. The result is that the dynamic range and contrast of the image formed by voltage modulation of the liquid crystal layer by the partitioned silicon photoconductive layer is much higher than has been possible heretofore, while maintaining high image resolution.

The above purpose is achieved in accordance with the present invention by providing a pixelized photoconductive substrate for voltage modulating a liquid crystal layer in response to input light. The substrate is partitioned into electrically isolated pixels to eliminate lateral spread of charge carriers therein, and increase the dynamic range of the liquid crystal light valve while preserving resolution. The substrate is partitioned by forming an interconnecting network of deep trenches in a surface thereof by, for example, magnetron plasma etching, and filling the trenches with an electrically insulating material such as silicon dioxide. In the preferred embodiment of the invention, the opposite surface of the substrate is etched away to expose the silicon dioxide in the trenches, thereby providing the substrate with partitions which extend completely therethrough between the opposite surfaces. If desired, the insulator-filled trenches may extend only partially through the substrate, thereby eliminating lateral spread of charge particles in the thickness of the substrate which is partitioned by the trenches.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 2 is a fragmentary plan view illustrating a partition arrangement for isolating pixels in a photoconductive substrate of the present LCLV;

FIGS. 3a to 3f are sectional views illustrating a method of fabricating an isolated pixel photoconductive substrate in accordance with the present invention; and FIG. 4 is a sectional view illustrating an alternative isolated pixel, photoconductive substrate structure embodying the present invention.

DETAILED DESCRIPTION OF THE INVENTION

Figure 1:
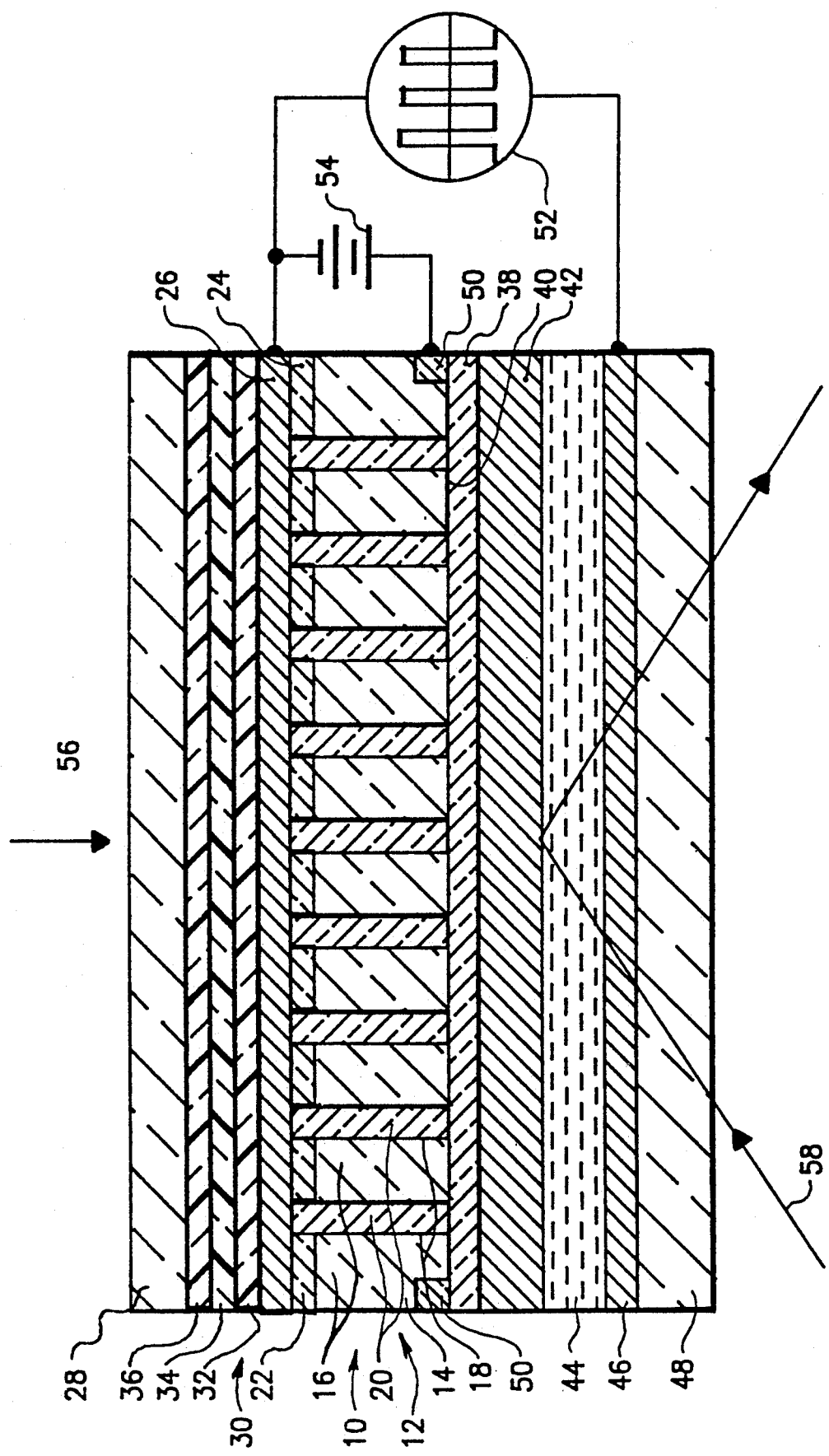
FIG. 1 is a sectional view illustrating a silicon LCLV embodying the present invention.

Referring to FIG. 1 of the drawings, a preferred embodiment of a silicon LCLV according to the present invention is generally designated as 10 and includes a voltage modulating photo-substrate 12 having a high resistivity, $\pi$-type silicon layer 14 With reference also being made to FIG. 2, the substrate 12 is partitioned into a plurality of electrically isolated pixels 16 by an interconnected network of channels 18 filled with an electrically insulating material 20. The channels 18 are preferably in the form of a rectangular grid.

A layer 22 of a very low resistivity P+ silicon is formed on a first surface 24 of the substrate 12, for example by ion implantation. The channels 18 extend through and partition the layer 22 in the same manner as the layer 14. A common electrode layer 26 of deposited low resistivity polysilicon or the like is formed over the first surface 24 of the substrate 12 in electrical contact with the areas of the conductive layer 22 between the channels 18.

A transparent face plate 28 is adhered to the electrode layer 26 by means of an appropriate cement (not shown) or electrostatic bonding through the intermediary of a trilayer 30 including a $SiO_2$ layer 32, a $Si_3N_4$ layer 34, and a $SiO_2$ layer 36. The material of the plate 28, preferably a suitable composition of glass, is selected to be thermally matched to the silicon layer 14. The trilayer 30 serves as a mobile ion barrier between the plate 28 and silicon layer 14.

The present LCLV 10 further includes a dielectric layer 38, formed of an appropriate, electrically insulating material such as $SiO_2$, on a second surface 40 of the substrate 12. A light blocking, dielectric mirror layer 42 is formed on the dielectric layer 38. A liquid crystal layer 44 is formed on the dielectric mirror layer 42. A transparent face plate 48 is coated with a transparent electrode layer 46 to form a sandwich with the other layers of the LCLV 10 together in combination with the face plate 28. Further illustrated is a guard ring 50 formed of n-silicon in the second surface 40 of the substrate 12 around the periphery thereof, which prevents peripheral minority carrier injection into the active region.

The LCLV 10 has the overall structure of a metal oxide semiconductor (MOS) capacitor, including the transparent electrode layer 46, the liquid crystal 44, dielectric mirror 42, and the dielectric oxide 38 layers as the overall insulator, and semiconductive silicon layer 14. The LCLV 10 is operated in alternating accumulation and depletion phases in response to an alternating current voltage applied from a power source 52 connected across the electrode layers 26 and 46. The alternating current waveform applied by the source 52 is in the form of a pulse having a relatively short negative interval corresponding to the accumulation phase and a relatively long positive interval corresponding to the depletion phase. Further illustrated is a direct current power source 54 for biasing the guard ring 50 positive with respect to the first electrode layer 26.

During the accumulation phase, a short negative pulse is applied which renders the second electrode layer 46 negative with respect to the first electrode layer 26. This causes the MOS capacitor to be charged by means of majority carriers (holes for the positive $\pi$-silicon layer 14) accumulating at the second surface 40 which constitutes an $Si/SiO_2$ interface. The minority carriers (electrons) residing in the interface (from a previous depletion phase) are pushed through the layer 14 toward the first electrode layer 26 and recombine with the majority carriers in the bulk portion of the layer 14. On the other side of the dielectric layer 38, electrons are pushed from the second electrode layer 46 through the liquid crystal layer 44 toward the dielectric layer 38.

In the depletion phase, which constitutes the main, active phase, the second electrode layer 46 is made positive with respect to the first electrode layer 26. The majority carriers (holes) are pushed away from the dielectric layer 38 toward the first electrode layer 26, creating a depletion region throughout the silicon layer 14. During this time, minority charge carriers, which are electrons in this case, are released from the electrode layer 26 and P+ doped silicon layer 22 and injected into the silicon layer 14.

A light image generated by an optical imaging system, cathode ray tube, or the like (not shown) is focussed onto the LCLV 10 through the face plate 28 in the direction of an arrow 56. Light incident on the silicon layer 14 causes localized absorption and the liberation of electron-hole pairs. Photogenerated electrons are swept by the electric field through the silicon layer 14 toward the dielectric layer 38. As a result, the silicon surface potential is modulated in response to the swept photogenerated electrons. This in turn results in a corresponding modulation in the voltage drop across the liquid crystal layer 44, hence its local activation. The activated regions of the liquid crystal layer 44, corresponding to the photoconductive regions in the silicon layer 44, modulate a readout light beam which is reflected by the dielectric mirror layer 42 as symbolically represented by an arrow 58. The operation of the LCLV 10 is such that the liquid crystal layer 44 is voltage modulated by the photoconductive silicon layer 14 of the substrate 12.

The problem which has remained in the prior art is that the minority charge carriers, in this case electrons, which are photogenerated in the $\pi$-silicon layer 14 in the vicinity of the first surface 24, tend to spread laterally due to diffusion as they are swept toward the second surface 40 by the applied electric field during the depletion phase of operation. This lateral diffusion begins in the depleted region near the surface 24, continues through the bulk of the layer 14, and is especially prevalent at the interface with the dielectric layer 38 where the charge resides for a finite length of time. As discussed above, the prior art expedient of a microdiode grid provided at the interface of the layers 14 and 38 is insufficient to prevent lateral diffusion of electrons at high charge densities, and is inoperative to prevent lateral diffusion in the bulk of the layer 14.

The LCLV 10 prevents lateral diffusion in the voltage modulating, photoconductive substrate 12 at all values of charge density by providing a partition means in the form of the channels 18 filled with an electrically insulating material 20 such as silicon dioxide, to partition the layer 14 into electrically isolated pixels. The partitions extend completely through the thickness of the layer 14 from the first surface 24 to the second surface 40 thereof, and also completely through the conductive layer 22. The insulative material 20 acts as a total barrier for lateral charge carrier diffusion, and thereby prevents interaction between adjacent pixels and a resulting loss of resolution. Thus, the dynamic range of the LCLV 10 and thereby the contrast ratio attainable may be increased to a level which has not been possible heretofore, while maintaining high device resolution.

A method of fabricating a LCLV including an isolated pixel, light modulating, photoconductive substrate in accordance with the present invention is illustrated in FIGS. 3a to 3f, in which elements subject to subsequent processing steps are designated by the same reference numerals used in FIGS. 1 and 2 primed. In FIG. 3a, a substrate 12' is provided in the form of a $\pi$-type silicon wafer approximately 5 mils thick, having an electrical resistivity on the order of 2 to 5 ohm-cm. A P+ silicon layer 22', which may be only a few tenths of a micron thick, is formed on the substrate 12' by ion implantation or any other suitable method. The layer 22' is heavily doped with boron or the like to make it highly conductive.

Referring now to FIG. 3b, deep trenches 18' are formed in the substrate 12' through the layer 22' by magnetron plasma etching or any other suitable process, using, for example, an aluminum mask to prevent etching in the areas between the trenches 18'. The trenches 18' are typically 2 to 3 microns wide and 20 to 60 microns deep. The spacing between adjacent trenches 18' is approximately 20 microns. After formation of the trenches 18', an optional passivation layer 60 of thermal oxide may be grown on the side walls of the trenches 18' to anneal any possible damage from the plasma etching, and to passivate the surface states.

It will be understood that the spacing between adjacent trenches 18' and the width of the trenches are made as small as possible in order to maximize image resolution while maintaining electrical isolation between pixels. The smallest values of trench width and spacing attainable in actual practice are limited by the level of existing manufacturing technology and realistic fabrication cost constraints. The values given above should be considered as being exemplary, and not restrictive of the scope of the invention.

The next step of the method is illustrated in FIG. 3c, and consists of depositing a layer 20' of $SiO_2$ over the substrate 12' which fills the trenches 18' and forms a coating on the substrate 12'. The layer 20' is then etched back as shown in FIG. 3d to a sufficient depth so as to expose the insulative material 20 in the trenches 18' and the conductive layer 22 between the trenches.

FIG. 3e illustrates the formation of the first electrode layer 26 on the substrate 12. The layer 26 may be formed by deposition or any other suitable method, and is then preferably planarized using a standard photoresist etch-back technique. As an alternative to the deposited P+ polysilicon layer as discussed above, the layer 26 may be formed of ITO. It is necessary that the layer 26, which constitutes an electrode, be in intimate electrical contact with the silicon layer 14 of the substrate 12 through the conductive layer 22.

In FIG. 3f, the trilayer 30 and face plate 28 are electrostatically bonded to the substrate 12'. The plate 28 is thermally matched to the silicon photosubstrate 26. Diffusion of mobile ions in the glass 28 to the photosubstrate plate 28 is prevented by the trilayer 30.

As further illustrated in FIG. 3f, a sufficient thickness of the substrate 12' below the trenches 18' is etched or otherwise removed to expose the insulative material 20 in the trenches 18'. The exposed second surface of the substrate 12 is polished using standard lapping and chemomechanical polishing techniques. The thickness of the substrate 12 after etching and polishing is preferably 30 to 100 microns. This completes the formation of the partitions in the substrate 12. After this step, the exposed trenches 18' constitute the channels 18 illustrated in FIG. 1.

Following the steps of FIG. 3f, the dielectric layer 38, dielectric mirror layer 42, are deposited onto the second surface 40 of the substrate 12 using conventional plasma enhanced chemical vapor deposition (PECVD) gate oxide deposition and annealing, and dielectric mirror deposition techniques. Fabrication of the isolated pixel LCLV is completed by insertion of the liquid crystal layer 44 between the dielectric mirror layer 42 and the face plate 48 coated with the second electrode layer 46.

The result of these final steps is the finished LCLV 10 illustrated in FIG. 1. The dielectric mirror layer 44 may be a $Si/SiO_2$ quarter-wavelength stack. The liquid crystal layer 44 may be formed of a positive anisotropy, 45° twisted-nematic, or perpendicular-aligned liquid crystal material.

It will be noted that the process steps of the invention need not necessarily be performed in the order illustrated in FIGS. 3a to 3e within the broad concept of the invention. For example, the steps of removing material 10 from the second surface 40 of the substrate 12' to expose the insulative material 20 in the trenches 18' as illustrated in FIG. 3f and the subsequently described steps may be performed prior to the steps beginning with FIG. 3c. This is because the processing of one side of the substrate 12' subsequent to formation of the trenches 18' and the filling thereof with the insulative material 20' may be performed independently of the processing of the other side of the substrate 12'.

The present isolated pixel, photoconductive substrate may be incorporated into any applicable type of LCLV other than the particular type described above, such as a metal matrix mirror IR-LCLV. As alternatives to silicon, the photoconductive substrate may be formed of any suitable material, such as gallium arsenide or cadmium sulfide. The material utilized to fill the partition trenches may be any appropriate electrically insulating material other than silicon dioxide, such as silicon nitride or a polymer substance. Although the preferred method of forming the trenches is magnetron plasma etching, any other process which accomplishes the desired result, such as wet etching or laser etching may be employed.

It is within the scope of the invention to form the trenches in the second surface of the substrate rather than the first surface thereof. Another modification is to provide electrically insulating partitions 72 which extend only partially through the thickness of a photoconductive substrate 70, as illustrated in FIG. 4. In this latter embodiment, the reduced level of electrical isolation between pixels may be justified by a lower processing cost.

As yet another modification, the conductive layer 22 may be omitted and the electrode layer 26 bonded directly to the silicon layer 14.

While several illustrative embodiments of the invention have been shown and described, numerous variations and alternate embodiments will occur to those skilled in the art, without departing from the spirit and scope of the invention. For example, the materials, relative electrical polarities and semiconductor impurity doping levels, etc. may be reversed or varied within a considerable range without departing from the teachings of the present disclosure. Accordingly, it is intended that the present invention not be limited solely to the specifically described illustrative embodiments. Various modifications are contemplated and can be made without departing from the spirit and scope of the invention as defined by the appended claims.

I claim:

1. A photoconductive structure for a liquid crystal light valve, comprising:
    a photoconductive, voltage modulating substrate; and
    electrically insulative partition means extending through the substrate between opposite surfaces thereof for partitioning the substrate into a plurality of electrically isolated pixels, said partition means comprising an interconnected network of channels filled with an electrically insulating and optically transparent material.

2. A photoconductive structure as in claim 1, in which the substrate is formed of a semiconductive material.

3. A photoconductive structure as in claim 2, in which the semiconductive material is $\pi$-type silicon.

4. A photoconductive structure as in claim 1, in which the substrate comprises semiconducting silicon and the insulating material comprises silicon dioxide.

5. A photoconductive structure as in claim 1, in which the channels are arranged in a rectangular grid with predetermined channel widths and spacings between adjacent channels, the spacing between adjacent channels is selected to enhance image resolution compared to said photoconductive structure without said channels, and the width of each channel is selected to maintain electrical isolation between pixels.

6. A photoconductive structure as in claim 5, in which the channels each have a width of 2 to 3 microns.

7. A photoconductive structure as in claim 1, further comprising a mobile ion barrier on one side of said substrate, said barrier including layers of the same material as said partitions.

8. A photoconductive structure as in claim 7 wherein said material is silicon dioxide.

9. A liquid crystal light valve, comprising:
    a liquid crystal layer;
    a photoconductive layer for voltage modulating the liquid crystal layer in response to input light; and
    electrically insulative and optically transparent partition means extending through the photoconductive layer between opposite surfaces thereof for partitioning the photoconductive layer into a plurality of electrically isolated pixels, said partition means having an interconnected network of channels filled with an electrically insulating material.

10. A liquid crystal light valve as in claim 9, further comprising:
    first and second transparent electrodes which sandwich the liquid crystal layer and photoconductive layer therebetween;
    a dielectric layer disposed between the liquid crystal layer and the photoconductive layer; and
    light reflecting and blocking means disposed between the liquid crystal layer and the dielectric layer.

11. A liquid crystal light valve as in claim 10, further comprising power source means for applying an alternating current electrical voltage across the first and second electrodes.

12. A liquid crystal light valve as in claim 9, in which the photoconductive layer comprises silicon and the insulating material comprises silicon dioxide.

13. A liquid crystal light valve as in claim 12, in which said silicon is $\pi$-type silicon.

14. A liquid crystal light valve as in claim 9, in which the photoconductive layer is formed of a semiconducting material.

15. A liquid crystal light valve as in claim 9, further comprising a mobile ion barrier on the opposite side of said photoconductive layer from said liquid crystal layer, said barrier including layers of the same material as said partitions.

16. A liquid crystal light valve as in claim 15, wherein said material is silicon dioxide.

17. A liquid crystal light valve as in claim 15, wherein said barrier is separated from said substrate by a conductive electrode.

* * * * *